June 23, 1970    J. R. ARSENAULT ET AL    3,517,144
INTEGRATED CIRCUIT PACKAGE PROGRAMMABLE TEST SOCKET
Filed Jan. 23, 1969    2 Sheets-Sheet 1

Joseph R. Arsenault
William N. Bogle,
INVENTORS

William G. Gasczynski
Lawrence A. Neureiter
Leonard Flank
Robert C. Sims
BY

June 23, 1970    J. R. ARSENAULT ET AL    3,517,144
INTEGRATED CIRCUIT PACKAGE PROGRAMMABLE TEST SOCKET
Filed Jan. 23, 1969    2 Sheets-Sheet 2

Joseph R. Arsenault
William N. Bogle,
          INVENTORS.
William G. Gapcynski
Lawrence A. Neureither
Leonard Flank
Robert C. Sims
BY

United States Patent Office 3,517,144
Patented June 23, 1970

---

3,517,144
INTEGRATED CIRCUIT PACKAGE PROGRAMMABLE TEST SOCKET
Joseph R. Arsenault, Bedford, Mass., and William N. Bogle, Canterbury, N.H., assignors, by mesne assignments, to the United States of America as represented by the Secretary of the Army
Filed Jan. 23, 1969, Ser. No. 793,272
Int. Cl. H01h *43/08*
U.S. Cl. 200—46                                            3 Claims

ABSTRACT OF THE DISCLOSURE

The test socket contains a plurality of contact washers sandwiched by a plurality of insulators to form a cylinder. Each plate is connected to a single terminal of the socket. Three sets of brushes connect selected contact washers to test equipment by way of feeler pins in the brushes. The selection is performed by a Mylar tape which has holes punched in it. The Mylar tape is placed between the brushes and the washers so as to allow connection of the pins to the washers only when there is presented a hole between the pin and the washer. The integrated circuit to be tested is plugged into the test socket.

BACKGROUND OF THE INVENTION

This invention is directed towards the field of testing. In the past when a large number of like units such as an integrated circuit were to be tested, a plurality of sockets already connected to the test equipment were provided. With this system a socket for each test to be performed was required. However, in a production line operation, this method is entirely too slow. Another method of performing the test could be carried out by the use of a coaxial switching matrix. This method is not acceptable in that the coaxial switching introduces random timing errors int the measurement. Therefore, there is a need for the present invention which allows for automatic testing of an integrated circuit without the introduction of random errors.

SUMMARY OF THE INVENTION

The test socket is made up of a head having socket pins therein, a plurality of contact washers or plates which are connected to different ones of the pins, ring insulators inserted between the washers so that together they form a cylinder shape, and a frame for holding the washers and insulators together, and to provide a support for three sets of brushes. The unit to be tested may be any device having a plurality of pins or terminals (either male or female) such as an integrated circuit. The unit is plugged into the test socket; therefore, making connections from its pins to the contact washers of the test socket. There are three sets of brushes each having a set of spring loaded feeler pins lined up with the contact washers. The pins are wired up to the test equipment. In order to program which pins are connected to which washer, a Mylar tape is positioned between the brushes and the contact washers. The testing routine to be run is stored into the tape by punching holes therein. When a hole comes up between one of the feeler pins and the washers, the pin, which is spring loaded, will make contact with the washer, and, therefore, connect a certain one of the terminals of the unit to be tested to a certain place in the test equipment. By the proper selection of the holes a certain test of the unit can be made. After the test Mylar tape can be moved so that a new set of holes are positioned between the brushes and the washers, and a different test can be performed. In this way all desired tests of the unit can be made with the only moving parts being the tape and the pins of the brushes.

DESCRIPTION OF THE PREFERRED EMBODIMENTS

Figure 1:
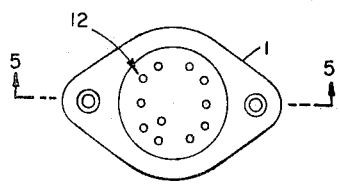
FIG. 1 is a diagrammatic representation of a top view of the invention.
Figure 2:
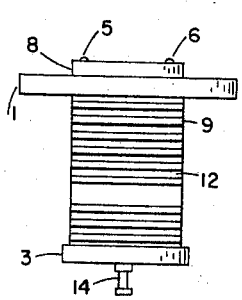
FIG. 2 is a diagrammatic representation of a front view of the invention.
Figure 3:
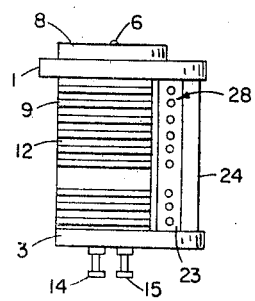
FIG. 3 is a diagrammatic representation of a side view of the invention.

FIGS. 1, 2, and 3 show the test socket as seen from the outside. A frame having ridges 1 and 3 is bolted together by bolts 5 and 6. The bolts also hold together the socket head 8, contact plates or washers 9, and insulating rings 12 shown in FIGS. 4 and 5. The bolt 10 and the frame are not shown in FIG. 4 for the sake of clarity. The contact plates and insulators 12 are in the shape of a washer with equal outside diameters, and a smaller inside diameter for the contact plate 9 so as to allow for the connection of the contact plate to the terminals 20. A ground terminal 14 and a B+ terminal 15 are provided for connection to two of the socket pins 20. Female pins or terminals 20 are shown as the unit to be tested has male terminals. The type and number of terminals 20 and plates 9 will be determined by design consideration of the unit to be tested, of course. The need of the terminals 14 and 15 will also be determined by the unit to be tested and the tests desired. Terminals 14 and 15 could be omitted, and extra contact plates provided. The frame provides support for three brushes 23, 24, and 25 which are the "one" input line, the "zero" input line and the output line. The brushes have sets of spring loaded feeler pins 27, 28, and 29 which make the contact with the plates 9. These feeler pins are wired up to the test equipment so as to connect select terminals of the integrated circuit package to be tested to the test equipment.

Figure 4:
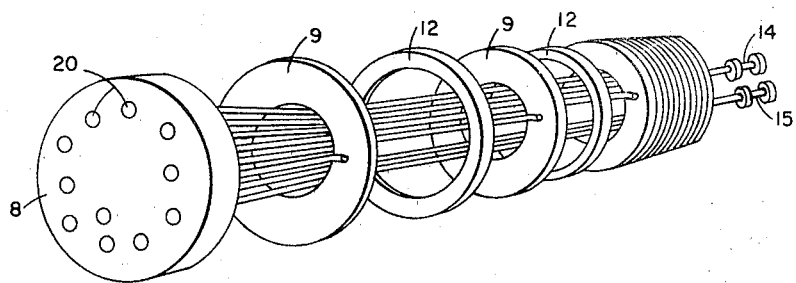
FIG. 4 is an exploded view of the inside of the test socket.

FIG. 4 shows the connection from the terminals 20 to the contact plates or disks 9. Each plate 9 is connected to a single one of the terminals 20. If terminals 14 and 15 are used, they are connected to two unused terminals 20.

Figure 5:
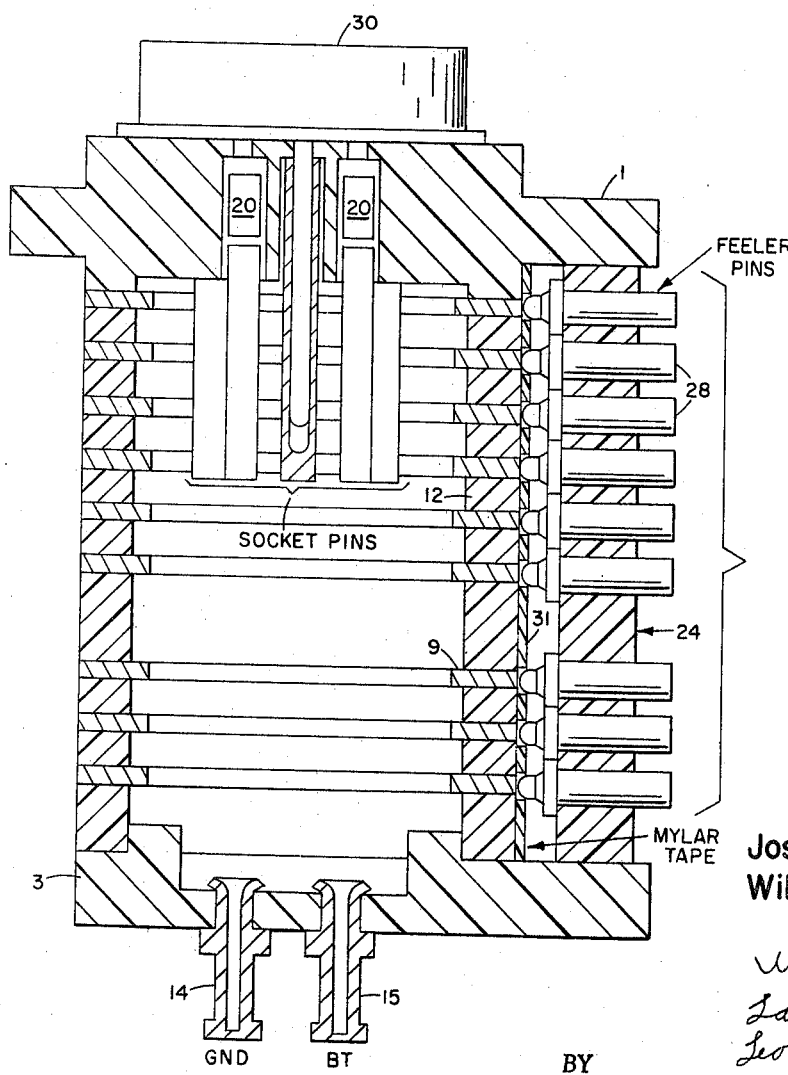
FIG. 5 is a cut away view of the invention taken along the lines of 5—5 of FIG. 1.
Figure 6:
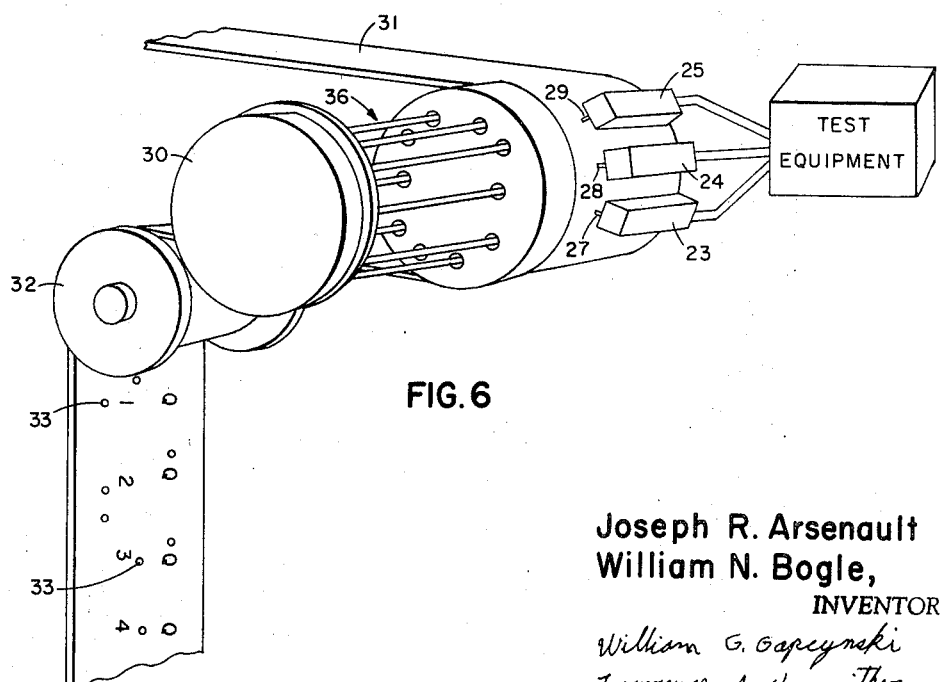
FIG. 6 is a diagrammatic showing of the invention in use without its outer shell.

FIGS. 5 and 6 show the test socket in use. FIG. 5 is shown cut away and FIG. 6 is shown without the frame for the sake of clarity. The unit 30 to be tested is shown connected to the socket. A Mylar tape 31 is positioned between the spring loaded feeler pins 27–29 and the contact plates 9. Appropriate mechanism is provided to drive the tape such as an idler sprocket 32, shown and viewing window, driving sprocket, guides, shafts, etc., not shown. Mylar tape 31 has holes 33 punched therein so as to allow a feeler pin to contact a contact plate when a hole comes up between the pin and the plate. In this manner, tape 31 determines which of the terminals 36 of the integrated circuit package 30 are connected to a particular feeler pin and in turn to a particular terminal of a test device. The Mylar tape, therefore, programs which of the test units terminals 36 are to be connected to the "one" input line, the "zero" input line, and the output or ground line. The Mylar tape is prepunched for the desired test setups, and, therefore, acts as a storage media for the testing. The tape can be marked to visually indicate the test being carried out through a viewing window, not shown.

Although only three brushes are shown in the preferred embodiment, obviously many more or less brushes (and, therefore, connections to test equipment) may be provided. Further, there could be provided more (or less) permanent connections such as the ones shown by terminals 14 and 15. These connections could be made to the test equipment as well as to power and ground. Other electrical insulating materials having holes punched therein could be used in place of the Mylar tape; such as IBM cards. While this invention has been described with reference to a preferred embodiment thereof, it will be apparent that various modifications and other embodiments thereof will occur to those skilled in the art within the scope of the invention. Accordingly, it is desired that the scope of the invention be limited only by the appended claims.

What is claimed is:

1. A socket unit comprising a head having a plurality of terminals a plurality of contact means, a plurality of insulating means, said contact means and said insulating means being sandwiched together to form the body of the socket unit, circuit means connecting said contact means to individual terminals of said plurality of terminals, at least one brush means, a plurality of feeler pins in each brush means, and said brush means being structurally positioned to the body such that the feeler pins will make circuit connections with individual ones of said contact means unless something is interposed between the feeler pins and the contact means.

2. A socket unit as set forth in claim 1, further comprising an electrical insulating material having selected holes punched therein, said feeler pins being spring loaded, and said material being movably interposed between the feeler pins and the contact means such that the feeler pins will not make circuit connections with the contact means unless there is a hole between the individual feeler pin and its associated contact plate.

3. A socket unit as set forth in claim 2, wherein the plurality of terminals in said head are adapted to receive an integrated circuit package which is to be tested; a frame means for supporting and containing said head, contact means, insulating means, brush means, and electrical insulating material; said electrical insulating material being a Mylar tape; said contact means and said insulating means being in the shape of washers with equal outside diameters and different inside diameters; said brush means being at least three in number; and the feeler pins being adapted to be connected to test equipment so that different tests may be performed on said integrated circuit package.

References Cited

UNITED STATES PATENTS 3,150,242   9/1964   Cartelli _____ 200—46

ROBERT K. SCHAEFER, Primary Examiner

H. J. HOHAUSER, Assistant Examiner

U.S. Cl. X.R.

324—158; 339—158, 176